(12) United States Patent
Ando et al.

(10) Patent No.: US 6,208,918 B1
(45) Date of Patent: Mar. 27, 2001

(54) DATA RECOVERY SYSTEM AND DATA RECOVERY PROGRAM RECORDED MEDIUM

(75) Inventors: Kouichi Ando, Susono; Toru Ito, Nagoya, both of (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 09/167,495

(22) Filed: Oct. 7, 1998

(30) Foreign Application Priority Data

Oct. 8, 1997 (JP) .................................................. 9-275658

(51) Int. Cl.[7] .......................... G06F 17/30; G06F 11/00; G01R 31/28
(52) U.S. Cl. ................................ 701/35; 701/36; 714/15; 714/5
(58) Field of Search ................................ 701/23, 24, 25, 701/26, 29, 30, 35, 207, 208, 209, 210, 224; 340/902, 825.29, 870.16; 714/15, 18, 2, 5, 774, 6, 16, 20

(56) References Cited

U.S. PATENT DOCUMENTS

| | | | |
|---|---|---|---|
| 4,258,421 | * 3/1981 | Juhasz et al. | 364/424 |
| 5,594,863 | * 1/1997 | Stiles | 395/182.13 |
| 5,619,412 | * 4/1997 | Hapka | 364/424.045 |
| 5,799,147 | * 8/1998 | Shannon | 395/182.04 |
| 5,835,915 | * 11/1998 | Carr et al. | 707/202 |
| 5,852,650 | * 12/1998 | Hyyrynen et al. | 379/29 |
| 5,884,019 | 3/1999 | Inaho | 714/6 |
| 6,038,679 | * 3/2000 | Hanson | 714/5 |

FOREIGN PATENT DOCUMENTS

| | | |
|---|---|---|
| 44 29 121 | 2/1996 | (DE) . |
| 195 19 066 | 5/1996 | (DE) . |
| 196 15 644 | 2/1997 | (DE) . |
| 0 444 544 | 5/1997 | (EP) . |
| 691 26 050 | 5/1997 | (DE) . |
| 3-270466 | 12/1991 | (JP) . |

* cited by examiner

Primary Examiner—Tan Nguyen
Assistant Examiner—Dalena Tran
(74) Attorney, Agent, or Firm—Finnegan, Henderson, Farabow, Garrett & Dunner, L.L.P.

(57) ABSTRACT

The present system executed data recovery without affecting other operations in the event that some recorded data has failed. In a database installed on a motor vehicle, program data, map data and the like used to carry out navigation are stored. If any set of these data has failed, a controller evaluates the urgency of recovery of the failed data set. For example, the urgency of recovery is evaluated by determining whether the failed data is part of a program in current use or whether it is map data scheduled to be used directly before long. Even if lower priority data in terms of the urgency of recovery has failed, the request for data recovery is issued at an appropriate delay timing instead of immediately requesting the information center to send that data, so that the influence of the data recovery on normal operation can be decreased.

14 Claims, 3 Drawing Sheets

DATA RECOVERY SYSTEM AND DATA RECOVERY PROGRAM RECORDED MEDIUM

BACKGROUND OF THE INVENTION

1. Field of the Invention

The present invention relates to a system designed such that, in the event that some program data, map data or the like fails and becomes impossible to use, the system executes data recovery by requesting a remote information center to send that data. The present invention also relates to such equipment for motor vehicle use, and a medium for recording a data recovery program.

2. Description of the Related Art

In Japanese Patent Laid-open Application No. Hei 3-270446, a technique was disclosed in which, if some portion of the data stored in a facsimile machine should fail, the facsimile machine would detect the data failure and request a remote backup center, which previously backed up all data including system data and telephone numbers stored in that facsimile machine, to send the original data to replace the failed data.

In this previous technique, however, because the facsimile machine was designed to issue a request for data transmission to the remote center immediately upon the occurrence of data failure, regardless of whether or not the facsimile machine requires the failed data promptly, such a problem arose that its normal communication function had to be disabled during the period from data transmission request until data recovery.

Therefore, if, for example, the above-mentioned technique is applied to a navigation system installed on a motor vehicle, and whenever any portion of the map data used in the navigation system has failed and has been put into the unusable state, the request for map data transmission is issued to the information center, even if there is no prompt need of that portion of the map data (for instance, the requested map data relates to an area that is a long way off from the current position of the motor vehicle). Such data recovery work for the data of less importance increases the idle load on a navigation controller and related devices and there is a possibility of affecting the inherent navigation function of the controller.

SUMMARY OF THE INVENTION

The object of the present invention is to provide a data recovery system and a data recovery program recorded medium that enable data recovery, while suppressing the influence of the data recovery on the normal communicating operation condition, in the event that any set of the stored data is put into the unusable state because of data failure or any other reason.

In order to achieve this object, the present invention offers a data recovery system that comprises storage means for storing data, an information center for detecting backing up of the data, detection means for detecting unusable data stored in the storage means, request means for requesting the information center to send the original data to replace the unusable data, and adjustment means for adjusting the timing of a request made by the request means, according to the urgency of recovery of the unusable data set. This data recovery system can execute data recovery without affecting normal operation by adjusting the data request timing in accordance with the urgency of data recovery and delaying the request of data transmission for the lower priority data in terms of the urgency of recovery, for which data transmission is requested at an appropriate delay timing.

In the above-mentioned data recovery system, preferably, the storage, detection, request, and adjustment means should be mounted on a motor vehicle. In addition, the adjustment means evaluates the urgency of recovery, based on the type of unusable data, which includes at least programs and data. If the unusable data is a program, the adjustment means will evaluate the urgency of recovery by determining whether the program that has just become unusable was running up to now. If that program was running up to now, the adjustment means sets the request timing at no delay; otherwise, the adjustment means sets the request timing at a given delay time instead of no delay.

Furthermore, the adjustment means should preferably evaluate the urgency of recovery, based on a geographical location attribute of the unusable data. The geographical location attribute means the location information included in the data, which typically represents, for map data, a geographical area covered by the map data. The adjustment means evaluates the urgency of recovery by determining whether the data that has just become unusable is for the peripheral area of the current position. If the data that has just become unusable is for the peripheral area of the current position, the adjustment means sets the request timing at no delay; otherwise, the adjustment means sets the request timing at a given delay time instead of no delay.

In order to achieve the object, furthermore, the present invention offers a data recovery system for motor vehicle use that comprises storage means mounted on a motor vehicle for storing data, detection means mounted on the motor vehicle for detecting unusable data stored in the storage means, request means mounted on the motor vehicle for requesting an information center to send the data to replace the unusable data, locating means mounted on the motor vehicle for locating the current position of the vehicle, and adjustment means mounted on the motor vehicle for evaluating the urgency of recovery of the unusable data, based on the relationship between the geographical location attribute of the unusable data and the current position of the vehicle, and for adjusting the timing of a request made by the request means, according to the evaluation result.

In order to achieve the object, furthermore, the present invention offers a computer readable medium on which a data recovery program is be recorded to execute data recovery by obtaining original data to replace failed data from an information center. This program causes the computer to perform a step of detecting the failed data, a step of determining the urgency of recovery of failed data, and a step of requesting the information center to send the original data to replace the failed data at a timing in compliance with the urgency of recovery.

DESCRIPTION OF PREFERRED EMBODIMENT

The preferred embodiment of the present invention is described below, with reference to the drawings.

Figure 1:
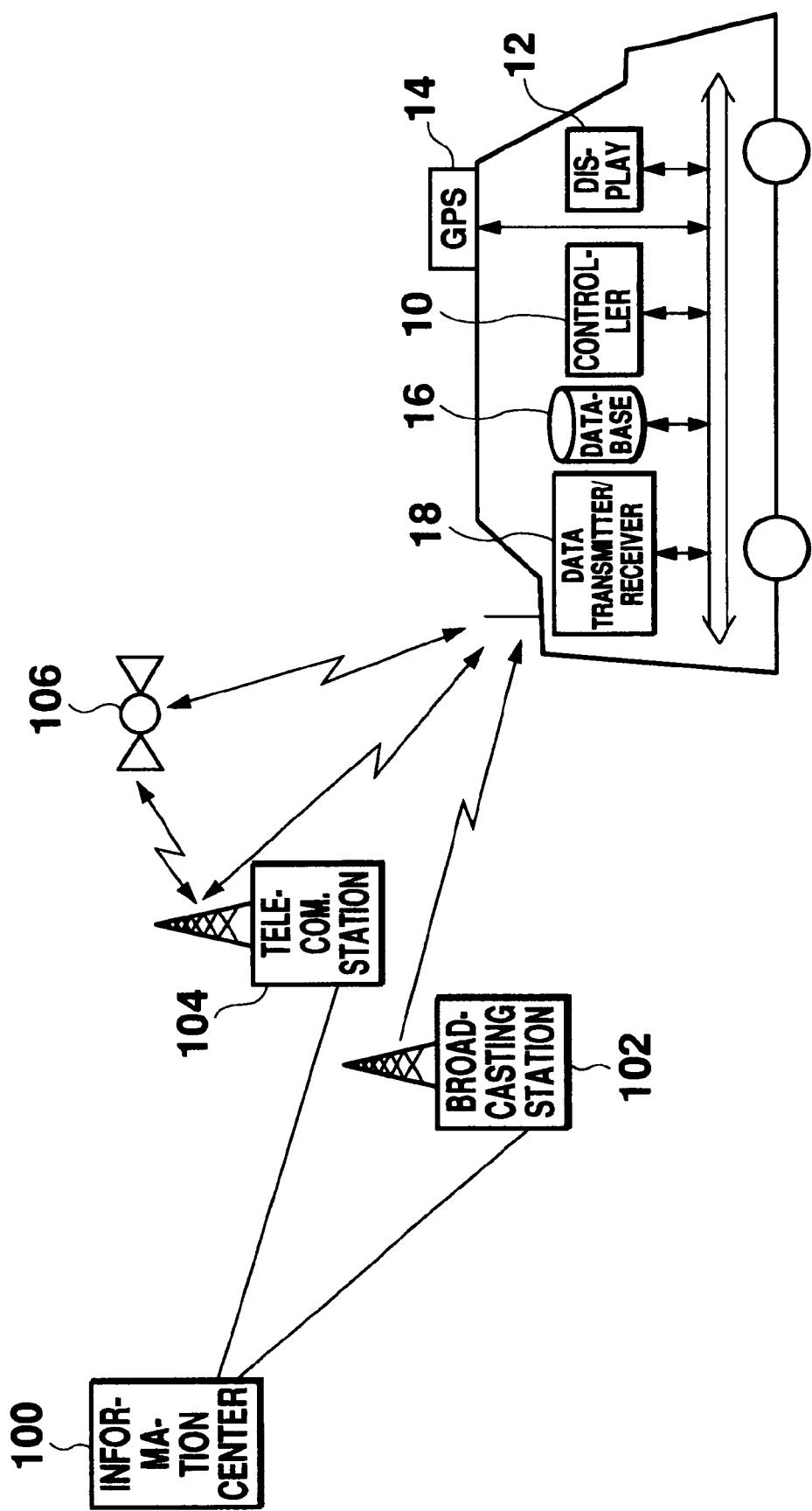
FIG. 1 shows a system structure in the preferred embodiment of the present invention.

FIG. 1 shows the structure of a system offered in the preferred embodiment of the present invention. This system transmits program data and other kinds of data stored in an information center 100, which is located outside, to a motor vehicle via a broadcasting station 102, a telecommunication center 104, such as a base station for wireless telephones, and a satellite 106. A data transmitter/receiver 18 is installed on a motor vehicle, and necessary information is requested from the information center 100, and the data sent from the information center 100 is received, via this data transmitter/receiver.

Furthermore, a motor vehicle is equipped with a controller 10 which performs a navigation function, a display 12 which displays the current position of a moving motor vehicle, map data, and routes to drive, a global positioning system (GPS) 14 which locates the position of a moving motor vehicle, and a database 16 which stores program data, map data and the like, and they are interconnected via a common bus for communication. Program data and map data obtained from the information center 100 via the data transmitter/receiver 18 are stored into the database 16 via the common bus for communication and the controller 10 performs navigation by using these data to assist the driver of the motor vehicle in driving to a destination. For the database 16, an optional medium that allows data rewriting can be used, for example, a flash RAM, a hard disk, or a DVD-RAM.

Figure 2:
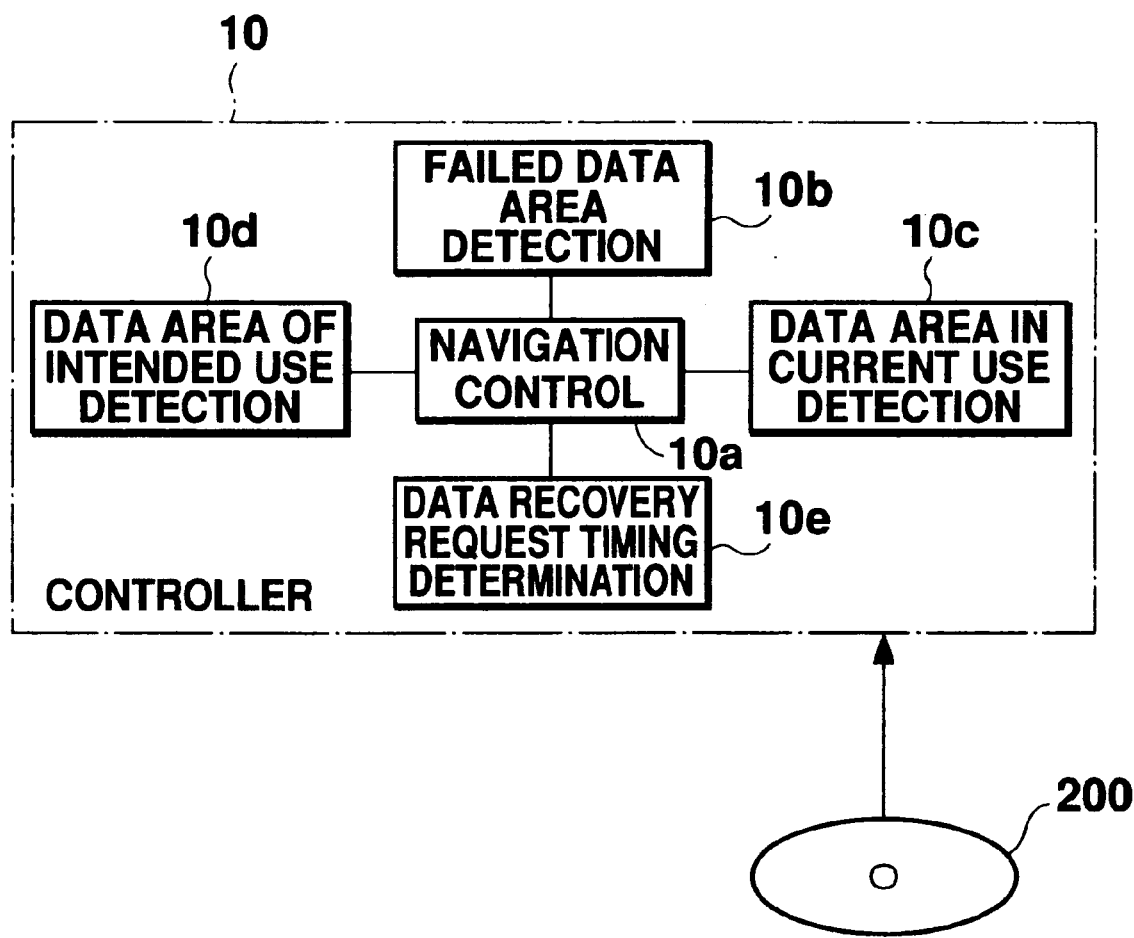
FIG. 2 shows a functional block diagram of a controller in the preferred embodiment.

FIG. 2 shows a functional block diagram of the controller 10. The controller 10 executes a navigation program stored in the database 16 and reads map data and other data of various kinds of facility information, if necessary, to make an overlay display of them on the display 12. The controller 10 comprises a navigation control unit 10a which searches for an optimum route to a destination, a failed data area detection unit 10b which detects a data area that has failed and become impossible to use in the data stored in the database 16, a data area in current use detection unit 10c which detects a data area being used now, a data area of intended use detection unit 10d which detects a data area that is not used now, but is expected to be used before long, and a timing determination unit 10e which determines the timing of a data recovery request to be issued to the information center 100 (that is, requesting the information center to send the original data corresponding to the data that is unusable). The data recovery timing, in other words, the timing of requesting the information center 100 to send the original data to replace the unusable data, is determined according to the urgency of recovery of the unusable data. More precisely, the timing determination unit 10e determines the timing of a failed data recovery request, based on the result in the aggregate of the detections made by the functional units 10b through 10d. Further details are described later. All these functions are actually enabled by a central processing unit (CPU) of a computer, installed on a motor vehicle, only after the CPU reads and executes a data recovery program stored in the memory in the controller 10.

The data recovery system offered in the preferred embodiment of the present invention is structured as above, and its operation is described below, with reference to the processing flowchart.

Figure 3:
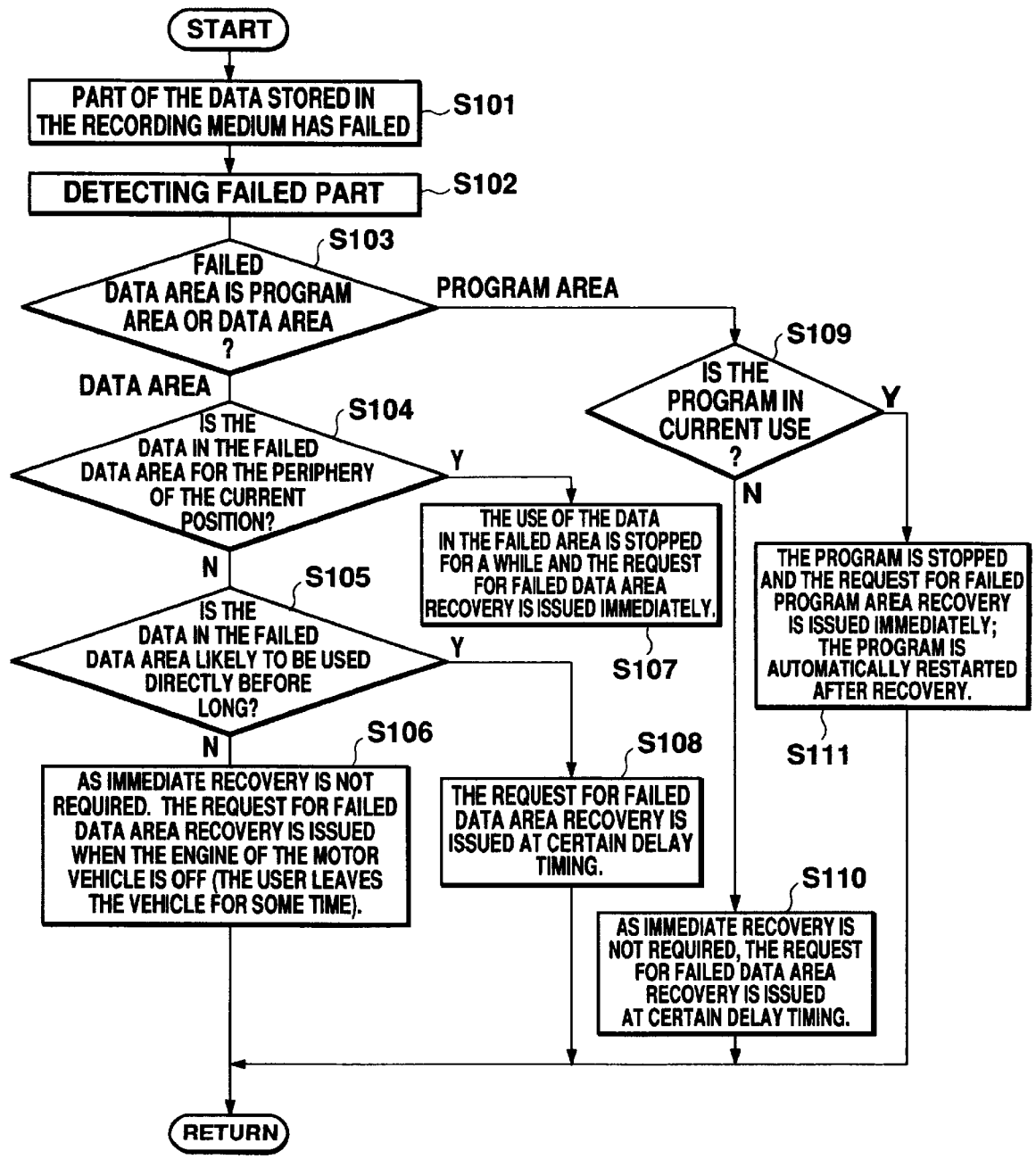
FIG. 3 shows a flowchart of the processing performed by the system in the preferred embodiment.

FIG. 3 shows a flowchart of data recovery processing performed by the controller 10. First, if a portion of the data stored in the database 16 fails and becomes impossible to use, for example, when the motor vehicle on which the present system is mounted is driving on a bad road (s101), the failed data area detection unit 10b of the controller 10 is activated to detect what portion of the data has failed (s102). Detection of a failed portion of the data is performed by executing an error detection program stored in the database 16 at given intervals. When the failed data area detection unit 10b detects a data area in error, the navigation control unit 10a determines whether the failed data area is a program area or a data area (S103). If the failed data area is a program area, the navigation control unit 10a determines whether the program data in question is being used now, based on the result of the detection made by the data area in current use detection unit 10c (S109). If the failed and unusable program data is, for example, a reseeking program (if the moving motor vehicle diverges from a recommended route, this program is used to search for a route to return to the recommended route or an optimal route to a destination), a map drawing program, or a positioning program for locating the current position of the moving motor vehicle, then the program data is essential to the navigation function and the program execution is always required to perform the navigation. Therefore, the program data in question is judged to be the one in current use and its evaluation for the urgency of recovery is high. When the data recovery request timing determination unit 10e thus determines that the data recovery timing is no delay recovery, the program execution is stopped and the information center 100 is immediately requested to execute the data recovery of the program area that has become impossible to use. In this case, the interaction between the units is as follows: the controller 10 outputs a timing control signal to the data transmitter/receiver 18 and the data transmitter/receiver 18 receives this signal and requests the information center 100 to send the original program data to replace the unusable data. Upon receipt of this request, the information center 100 transmits the requested program data to the data transmitter/receiver 18 on the motor vehicle via a broadcasting station 102, a telecommunication center 104, or a satellite 106. Upon receiving the program data sent from the information center 100, the data transmitter/receiver 18 transfers it via the common bus to the database 16 where the program data is stored into a different area. The program in question is automatically restarted upon acquiring the required program data from the information center 100 (S111). If data, whose recovery urgency is high, fails and becomes impossible to use, in this way, no delay data recovery is performed by immediately issuing the data transmission request to the information center 100.

On the other hand, if the unusable program data is judged to be not in current use in step S109, for example, it is a route seeking program to a destination or a program providing facility information, its evaluation for the urgency of recovery is relatively low and immediate data recovery is not necessarily required. Therefore, the data recovery request timing determination unit 10e sets the data recovery timing at "certain delay time" and the request for the failed data area recovery is issued to the information center 100 at this set timing (S110).

The wording "certain delay time" means time immediately before it becomes necessary to recover the data in the failed data area while any processing other than data recovery is performed and the load on the controller 10 is relatively small. In other words, the data recovery request should be issued at a timing so that the data recovery can be performed without imposing an additional heavy load on the processing currently being executed.

If the failed data area is judged to be a data area, in step S103, the navigation control unit 10a determines whether the data in the failed data area relates to the peripheral area in the vicinity of the current position of the moving motor vehicle (s104). This determination is made by making a comparison between the current position of the moving motor vehicle, detected by the GPS 14, and the geographical location attribute of the failed data area (if, for example, map data has failed and become impossible to use, its location attribute is the area covered by the map data, and if a facility data has failed, its location attribute is the location of the facility site). If the distance between both falls within a given distance, it will be determined that the failed data relates to the periphery of the current position of the moving motor vehicle. If the failed and unusable data relates to the periphery of the current position of the moving motor vehicle, its evaluation for the urgency of recovery is high and therefore the data recovery request timing determination unit 10e determines that the recovery timing is no delay recovery. Then, the use of the data in the failed data area is stopped for a while and the request for the failed data area recovery is immediately issued to the information center 100, that is, an output is made to request the information center 100 to send the original data to replace the unusable data (s107).

On the other hand, if the data in the failed data area does not relate to the periphery of the current position of the moving motor vehicle, for example, the geographical location attribute of the failed data area is separated from the vehicle's current position by more than a given distance, the navigation control unit 10a determines whether the data in that area is likely to be used directly before long, based on the result of the detection made by the data area of intended use detection unit 10d. This determination can be made according to, for example, whether or not the geographical location attribute of the failed data area indicates the location on a scheduled (recommended) route, along which the motor vehicle will drive, and that location is not far from the current position of the moving motor vehicle. In this way, if the data in the failed data area is likely to be used directly before long, its evaluation for the urgency of recovery is medium and the data recovery request timing determination unit 10e sets the recovery timing at "certain delay time," as processed in the S110 phase, and the request for the failed data area recovery is issued to the information center 100 at this set timing (S108).

If the data in the failed data area is not likely to be used soon, for example, the geographical location attribute of the failed data area is out of the scheduled route, along which the motor vehicle will drive, and that location is a long way off from the current position of the moving motor vehicle, its evaluation for the urgency of recovery is low and immediate data recovery is not necessary. Therefore, the data recovery request timing determination unit 10e sets the recovery timing at a "given time after the engine of the motor vehicle is turned OFF" (for example, one hour after the engine stop) and the request for the failed data area recovery is issued to the information center 100 at this set timing (S106). The reason why the data recovery request is not issued immediately after the engine of the motor vehicle is turned OFF is that it was taken into consideration that the driver might sometimes alight the motor vehicle only for a while, for example, to enter a convenience store or for other purposes.

In this way, by issuing the request for data recovery to the information center after the elapse of a given time after the engine of the motor vehicle is turned OFF, the unusable data can be recovered automatically without affecting other processing and the data recovery processing is transparent to the user, or the driver.

Concerning the s106 processing phase, the data recovery request may be issued when the engine of the motor vehicle is turned OFF at home (if the position of the motor vehicle matches the position of the vehicle owner's home when the engine is turned OFF) or when the motor vehicle is driving on a highway at a given speed and the load of the controller 10 is light, rather than when a certain time has passed after the engine stop.

Concerning the S106, S108, and S110 processing phases, before the request for data recovery is issued to the information center 100, the data recovery request timing determination unit 10e may determine the data recovery request timing, taking account of the amount of the failed and unusable data and how long it takes for the information center 100 to complete the transmission of the data to the motor vehicle. Practically, if the failed data amount is large and the required transmission time is considered to be long, the request for data transmission should be issued to the information center 100 when the load on the controller 10 is light and the motor vehicle is in an area where long and stable data reception can be expected. Of course, from the information center 100, the recovery data may be transmitted multiple times to complete all the required data. Alternatively, a communication media may be selected, according to the amount of unusable data.

In the present embodiment, a data recovery program for all phases of the processing shown in FIG. 3 is stored in the memory of the controller 10 and the cpu sequentially executes this data recovery program so that a data recovery operation is performed. As shown in FIG. 2, the data recovery program can be installed from an optional medium 200, on which it was previously recorded, into the controller 10. A magnetic, optical, or electrical recording medium such as a CD-ROM, a DVD-ROM, etc. can be used as the program recorded medium.

As described above, because the data recovery system offered by this invention adjusts the data recovery timing, according to the urgency of recovery of the data that has failed and become impossible to use, it enables the reliable recovery of the unusable data while suppressing the influence of the data recovery on normal operation.

What is claimed is:

1. A data recovery system comprising:
   storage means for storing data;
   an information center for backing up said data;
   detection means for detecting unusable data stored in said storage means;
   request means for requesting said information center to send the original data to replace said unusable data; and
   adjustment means for adjusting a timing of a request made by said request means, according to an urgency of recovery of said unusable data.

2. The system according to claim 1, wherein said storage, detection, request, and adjustment means are mounted on a motor vehicle.

3. A data recovery system comprising:
   storage means for storing data;
   an information center for backing up said data;
   detection means for detecting unusable data stored in said storage means;
   request means for requesting said information center to send the original data to replace said unusable data; and
   adjustment means for adjusting a timing of a request made by said request means, according to an urgency of recovery of said unusable data; wherein said adjustment means evaluates said urgency of recovery based on a type of said unusable data.

4. The system according to claim 3, wherein said type includes at least programs and data.

5. The system according to claim 4, wherein, if the unusable data is a program, said adjustment means evaluates the urgency of recovery by determining whether the program was running up to now.

6. The system according to claim 5, wherein, if the program was running up to now, the said adjustment means sets said request timing at no delay.

7. The system according to claim 5, wherein, if the program is not in current use, said adjustment means sets said request timing at predetermined delay time instead of no delay.

8. A data recovery system, comprising:
   storage means for storing data;
   an information center for backing up said data;
   detection means for detecting unusable data stored in said storage means;
   request means for requesting said information center to send the original data to replace said unusable data; and
   adjustment means for adjusting a timing of a request made by said request means, according to an urgency of recovery of said unusable data; wherein said adjustment means evaluates said urgency of recovery based on a geographical location attribute of said unusable data.

9. The system according to claim 8, wherein said adjustment means evaluates said urgency of recovery by determining whether said unusable data is for the peripheral area of the current position.

10. The system according to claim 9, wherein said adjustment means sets said request timing at no delay if said unusable data is for the peripheral area of the current position.

11. The system according to claim 9, wherein said adjustment means sets said request timing at predetermined delay time instead of no delay, if said unusable data is not for the peripheral area of the current position.

12. The system according to claim 11, wherein said adjustment means determines said request timing by judging the possibility of future use of said unusable data.

13. A data recovery system for motor vehicle use comprising:
   storage means mounted on a motor vehicle for storing data;
   detection means mounted on the motor vehicle for detecting unusable data stored in said storage means;
   request means mounted on the motor vehicle for requesting an information center to send the original data to replace said unusable data;
   locating means mounted on the motor vehicle for locating the current position of the vehicle; and
   adjustment means mounted on the motor vehicle for evaluating the urgency of recovery of said unusable data, based on the relationship between the geographical location attribute of said unusable data and said current position of the vehicle, and for adjusting the timing of a request made by said request means, according to said evaluation result.

14. A computer readable medium on which a data recovery program is recorded to execute data recovery by obtaining original data to replace failed data from an information center, said program causing the computer to perform the following steps:
   detecting said failed data;
   determining the urgency of recovery of said failed data; and requesting the information center to send original data to replace said failed data at a timing in compliance with said urgency of recovery.

* * * * *